US012759210B2

(12) United States Patent
Zanelli et al.

(10) Patent No.: US 12,759,210 B2
(45) Date of Patent: Oct. 13, 2026

(54) GRIP DEVICE FOR THE SUPPORT AND MOVEMENT OF PREFORMS

(71) Applicant: SACMI IMOLA S.C., Imola (IT)

(72) Inventors: Matteo Zanelli, Imola (IT); Mirco Massari, Parma (IT)

(73) Assignee: SACMI IMOLA S.C., Imola (IT)

( * ) Notice: Subject to any disclaimer, the term of this patent is extended or adjusted under 35 U.S.C. 154(b) by 985 days.

(21) Appl. No.: 18/073,712

(22) Filed: Dec. 2, 2022

(65) Prior Publication Data

US 2023/0174322 A1 Jun. 8, 2023

(30) Foreign Application Priority Data

Dec. 2, 2021 (IT) ........................ 102021000030506
Dec. 2, 2021 (IT) ........................ 102021000030539

(51) Int. Cl.

*B65G 47/91* (2006.01)
*B25J 15/02* (2006.01)
*B29C 49/36* (2006.01)
*B29C 49/42* (2006.01)
*B29L 31/00* (2006.01)

(52) U.S. Cl.

CPC ........ *B29C 49/36* (2013.01); *B29C 49/42065* (2022.05); *B29C 49/42079* (2022.05); *B65G 47/91* (2013.01); *B29L 2031/712* (2013.01)

(58) Field of Classification Search

CPC ....... B65G 47/91; B25J 15/02; B25J 15/0641; B25J 15/1612; B25J 15/0633; B29C 49/36; B29C 49/42065; B29C 49/42079
USPC .................................................. 294/183, 186
See application file for complete search history.

(56) References Cited

U.S. PATENT DOCUMENTS

| | | | | |
|---|---|---|---|---|
| 6,779,651 | B1 | 8/2004 | Linglet et al. | |
| 8,202,079 | B2 | 6/2012 | Litzenberg et al. | |
| 9,676,102 | B2 * | 6/2017 | Li | B66C 1/0212 |
| 10,562,194 | B2 * | 2/2020 | Kawamoto | B25J 15/0052 |

(Continued)

FOREIGN PATENT DOCUMENTS

| | | | |
|---|---|---|---|
| DE | 102018110803 A1 | 11/2019 |
| GB | 1439723 A | 6/1976 |
| WO | 2011051586 A1 | 5/2011 |

OTHER PUBLICATIONS

European Search Report for European Application No. 22210818.5, dated Mar. 13, 2023, 5 pages.

(Continued)

*Primary Examiner* — Paul T Chin
(74) *Attorney, Agent, or Firm* — CANTOR COLBURN LLP

(57) ABSTRACT

A grip device for the support and movement of preforms which extends along a longitudinal axis and is of the type provided with an access port which forms, at a rim, an annular radial flaring which lies on a surface of arrangement that is substantially perpendicular to the longitudinal axis. The grip device includes a supporting element which is functionally associated with an air supply conduit and is connected to at least one air exit nozzle which is adapted to generate at least one respective air flow which is designed to arrange itself parallel to at least one portion of the radial flaring of a preform to be held in order to enable the preform to be supported without contact.

9 Claims, 6 Drawing Sheets

(56) References Cited

U.S. PATENT DOCUMENTS

| | | | | |
|---|---|---|---|---|
| 2006/0138793 | A1* | 6/2006 | Tanae | B65G 47/91 294/64.3 |
| 2010/0176540 | A1* | 7/2010 | Sperka | B29C 49/58 425/535 |
| 2011/0142981 | A1 | 6/2011 | Borgatti et al. | |
| 2012/0048683 | A1 | 3/2012 | Forsthoevel et al. | |
| 2013/0180219 | A1* | 7/2013 | Chauvin | B65B 3/022 53/559 |
| 2014/0174652 | A1* | 6/2014 | Groeninger | B25J 15/0616 228/176 |
| 2014/0353884 | A1* | 12/2014 | Sato | B29C 49/12 425/525 |
| 2019/0330093 | A1* | 10/2019 | Lopez | C03B 9/3636 |
| 2020/0361133 | A1* | 11/2020 | Okuyama | B29C 49/46 |
| 2021/0362394 | A1* | 11/2021 | Hoshino | B29C 49/46 |

OTHER PUBLICATIONS

European Search Report for European Application No. 22210822.7, dated Mar. 14, 2023, 5 pages.

Italian Search Report for Italian Application No. 202100030506 dated Jun. 24, 2022, 6 pages.

Italian Search Report for Italian Application No. 202100030539 dated Jul. 4, 2022, 7 pages.

* cited by examiner

GRIP DEVICE FOR THE SUPPORT AND MOVEMENT OF PREFORMS

CROSS-REFERENCE TO RELATED APPLICATIONS

This application is related to and claims the benefit of Italian Patent Application No. 102021000030506, filed on Dec. 2, 2021 and Italian Patent Application 102021000030539, filed on Dec. 2, 2021, the contents of which are herein incorporated by reference in their entirety.

TECHNICAL FIELD

The present disclosure relates to a grip device for the support and movement of preforms.

BACKGROUND

The conveyance and movement of plastic preforms for the production of containers is usually done using grip devices and supporting devices that engage substantially at the neck region of the preform.

Such grip devices are used, for example, to convey preforms along a preset path, for example inside a conditioning oven arranged upstream of a blow-molding machine, or for feeding, or unloading, the preforms into and out of the various stations of a handling apparatus.

In some cases, the grip devices are constituted by grip clamps that engage on the external surface of the neck of the preform, while in other cases “grippers” are used which expand to grip the inner surface of the preform.

Solutions are also known in which the grip heads are functionally associated with nozzles that create a vacuum inside the preform body, creating a hermetic seal on the upper rim.

Traditional grip devices, although widely used, however are not devoid of drawbacks, especially if preforms need to be handled that have non-standardized shape structures, because for example they have mouths of considerable dimensions.

SUMMARY

The aim of the present disclosure is to provide a grip device for the support and movement of preforms that is capable of improving the known art in one or more of the above mentioned aspects.

Within this aim, the disclosure makes available a grip device for the support and movement of preforms that makes it possible to efficiently and reliably support the preforms, even with non-standardized shape structures.

the disclosure also provides a grip device for the support and movement of preforms that is highly reliable, easy to implement and of low cost.

This aim and these and other advantages which will become more apparent hereinafter are achieved by providing a grip device for the support and movement of preforms according to the independent claim, optionally provided with one or more of the characteristics of the dependent claims.

BRIEF DESCRIPTION OF THE DRAWINGS

Further characteristics and advantages of the disclosure will become better apparent from the description of some preferred, but not exclusive, embodiments of the grip device for the support and movement of preforms according to the disclosure, which are illustrated for the purposes of non-limiting example in the accompanying drawings wherein.

DETAILED DESCRIPTION OF THE DRAWINGS

Figure 1:
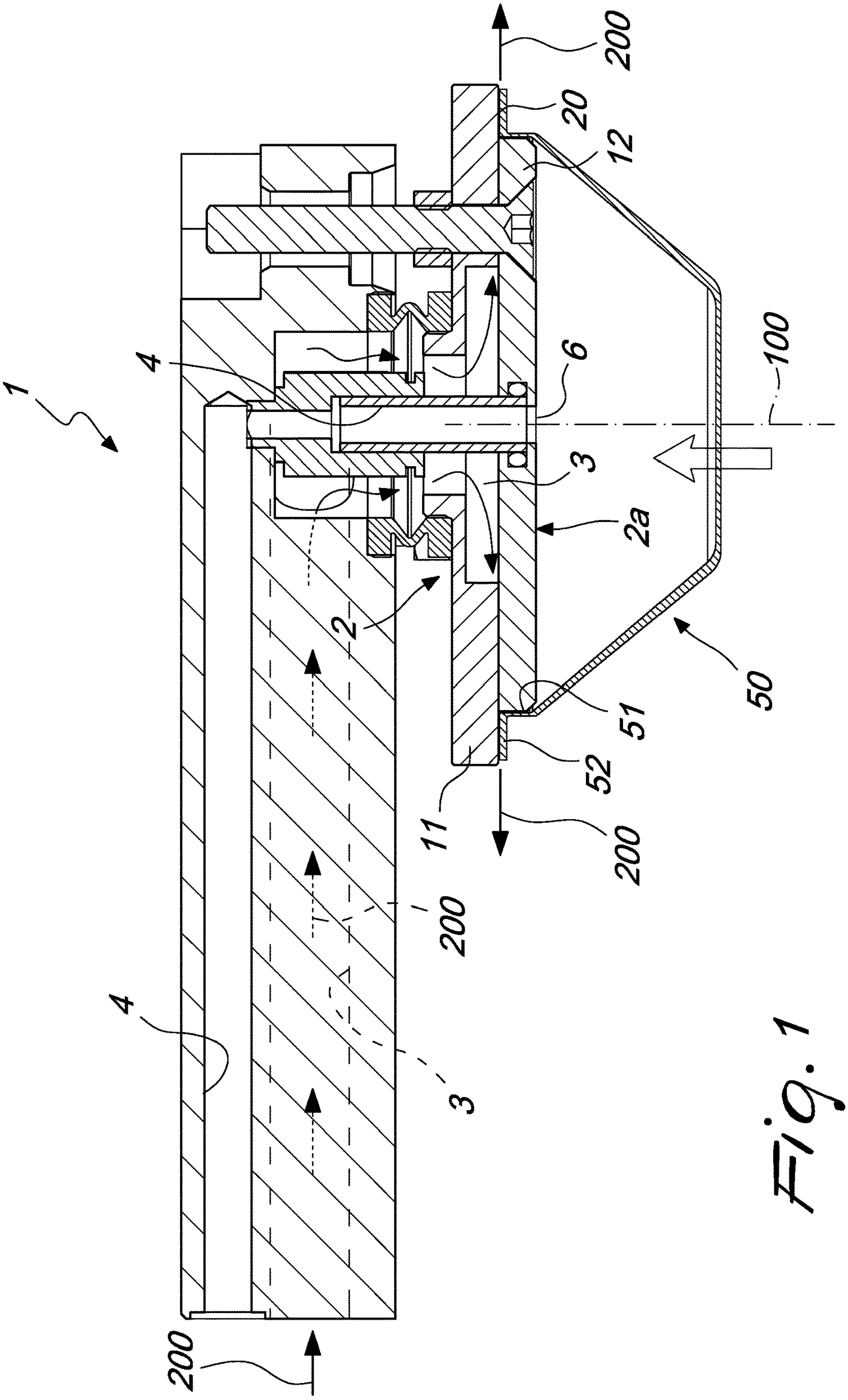
FIG. 1 is a cross-sectional view of a first embodiment of the grip device, wherein the grip element supports and holds a respective preform.

With reference to the figures, the present disclosure relates to a grip device, generally designated by the reference numeral 1, for the support and movement of preforms 50, which extend along a longitudinal axis 100 and are of the type with an access port 51 which defines, at the rim 51*a*, an annular radial flaring 52 that lies on a plane of arrangement that is substantially perpendicular to the longitudinal axis 100.

According to the present disclosure, the grip device 1 comprises a supporting element 2 which is operatively associated with an air supply conduit 3 and is connected to at least one air outflow nozzle 5.

The at least one nozzle 5 is, in particular, adapted to generate at least one respective flow of air which is designed to arrange itself parallel to at least one portion of the radial flaring 52 of a preform 50 to be held in order to enable the preform 50 to be supported without contact.

In practice, the supporting element 2 is configured so as to provide an annular “Bernoulli” sucker which is designed to face, at least partially, toward the radial flaring 52 of a preform 50 to be held.

Advantageously, the supporting element 2 comprises a centering body 2*a* which is designed to engage at the access mouth 51 of the preform 50 to be supported.

Conveniently, the supporting element 2 comprises a delivery port 6, connected to an air delivery conduit 4, which leads, during use, inward into the preform 50.

The supply conduit 3 and, if present, the delivery conduit 4, are connected to means for supplying compressed air or air under pressure (not shown in the figures).

The delivery port 6 is struck, on command, by a flow of air which is adapted to facilitate, if necessary, the disengagement of the preform 50 from the supporting element 2.

The grip device 1 comprises actuation means which are configured to force the passage of air through the supply conduit 3 so as to enable the supporting element 2 to hold the preform 50.

These actuation means can be configured to force the passage of air also through the delivery conduit 4, when it is necessary to release the preform 50 from the supporting element 2.

Conveniently, the supporting element 2 defines a surface 20, preferably flat and preferably with an annular extension, which is designed to face upward toward the radial flaring 52 of the preform 50.

In this specific case, the (or each) nozzle 5 is adapted to convey the respective air flow so as to strike the surface 20 so as to create a partial vacuum that is such as to allow the supporting element 2 to hold the preform 50.

Specifically, the partial vacuum is generated substantially exclusively at the annular portion 20 arranged opposite the radial flaring 52 of the preform.

Figure 2:
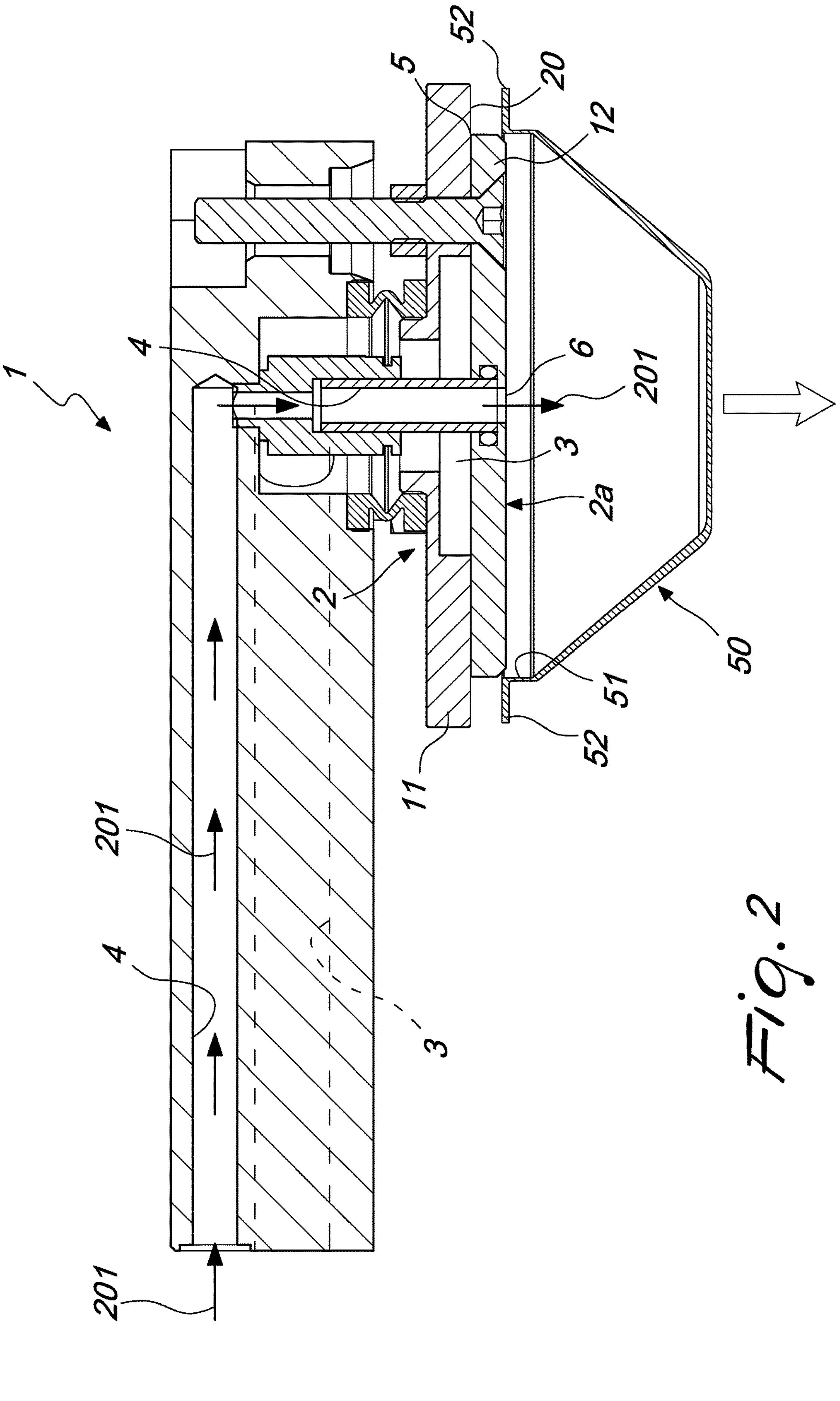
FIG. 2 is a view similar to that of FIG. 1, but wherein the preform is decoupled from the grip element.
Figure 3:
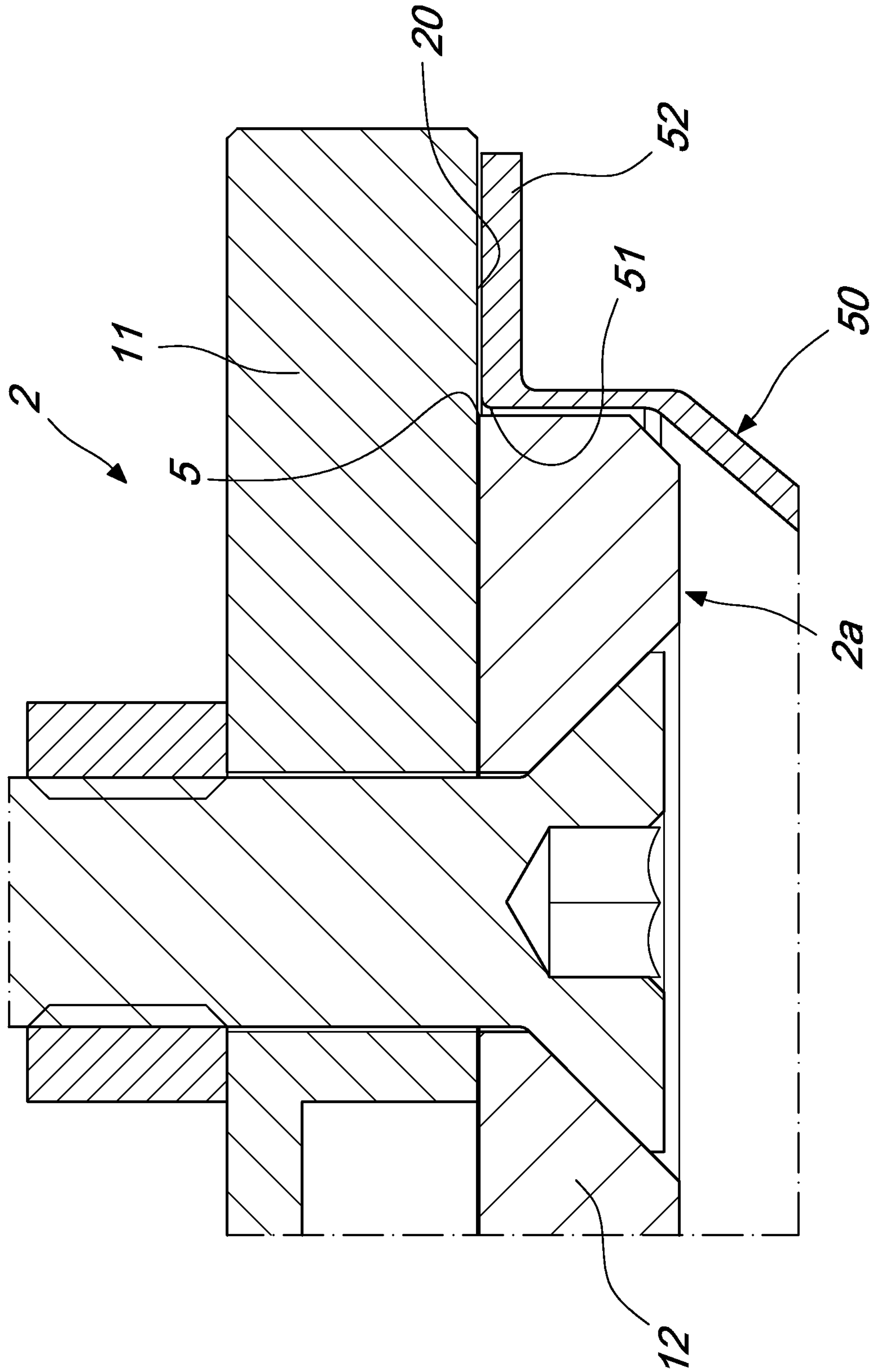
FIG. 3 is an enlargement of a portion of the cross-section of FIG. 1.
Figure 4:
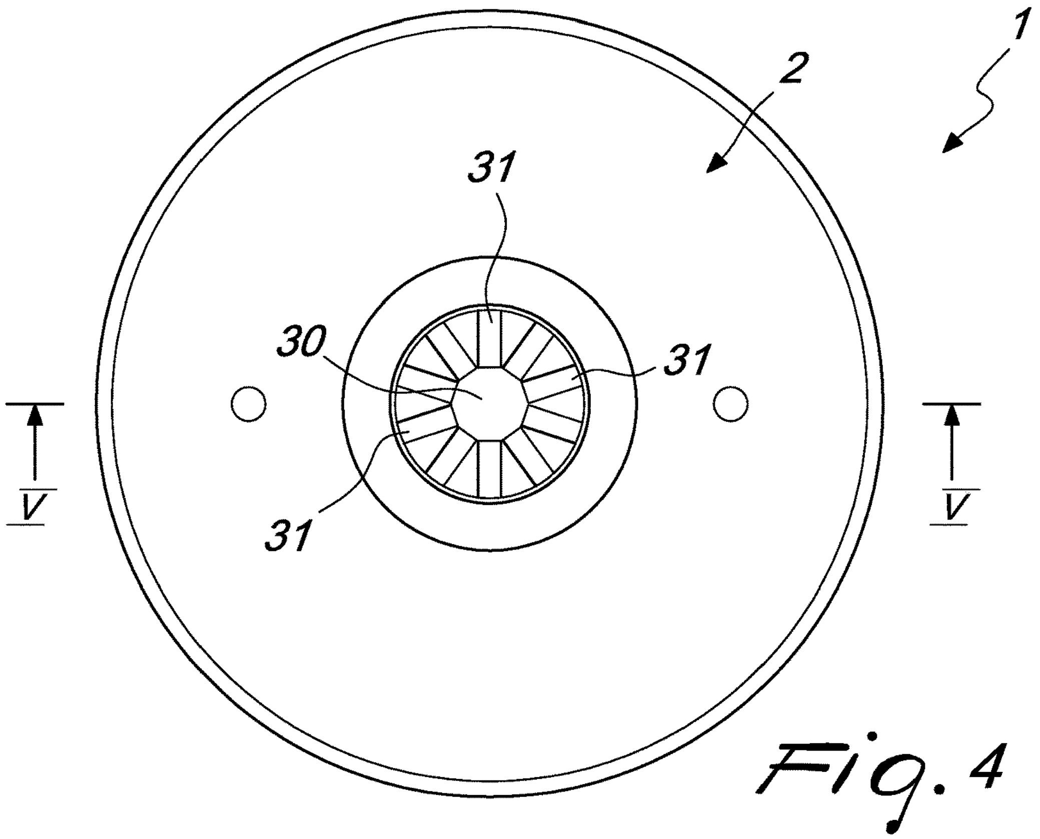
FIG. 4 is a front elevation view of a second embodiment of the grip device according to the disclosure.
Figure 5:
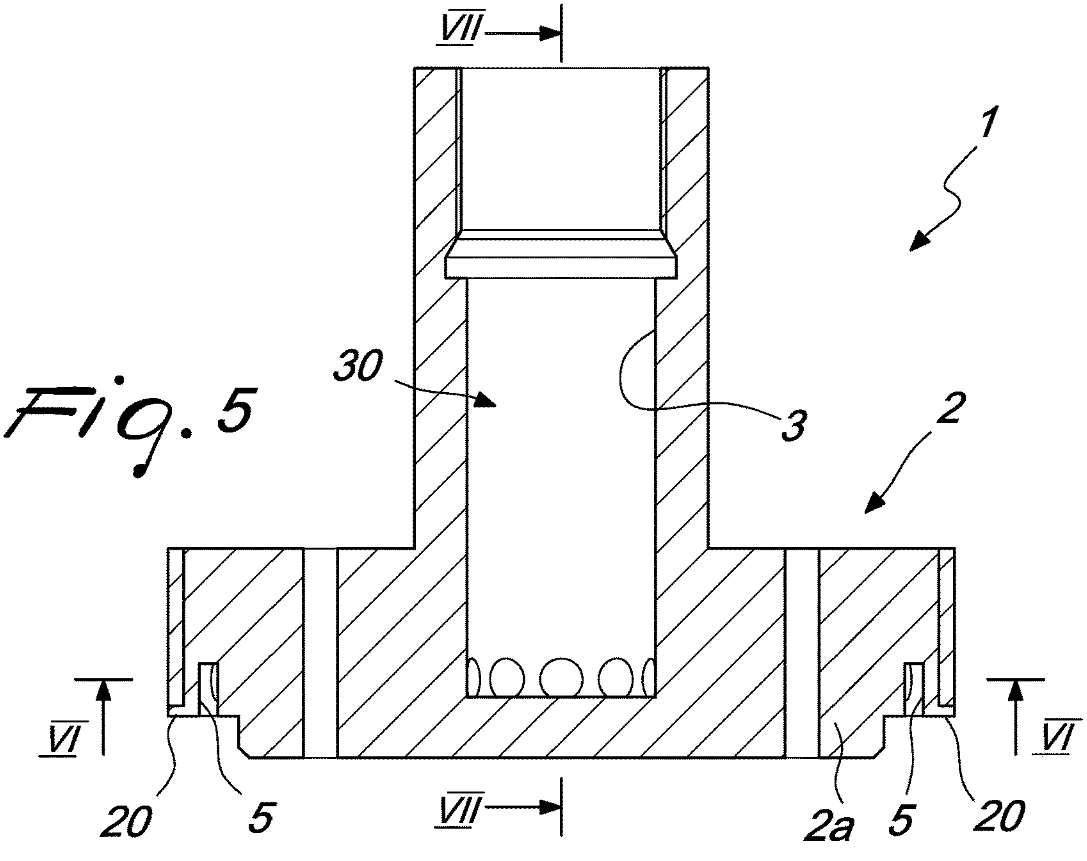
FIG. 5 is a cross-sectional view of the grip device taken along the plane of arrangement identified by the line V-V of FIG. 4.
Figure 6:
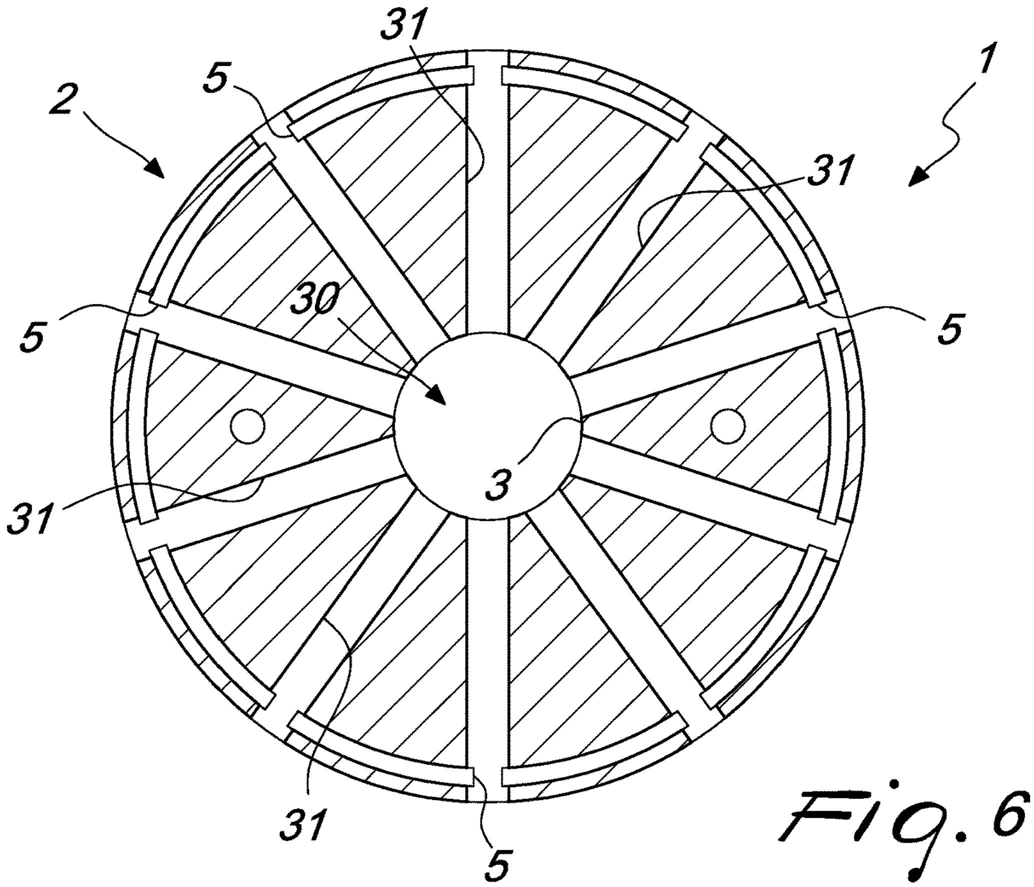
FIG. 6 is a cross-sectional view of the grip device taken along the plane of arrangement identified by the line VI-VI of FIG. 4.
Figure 7:
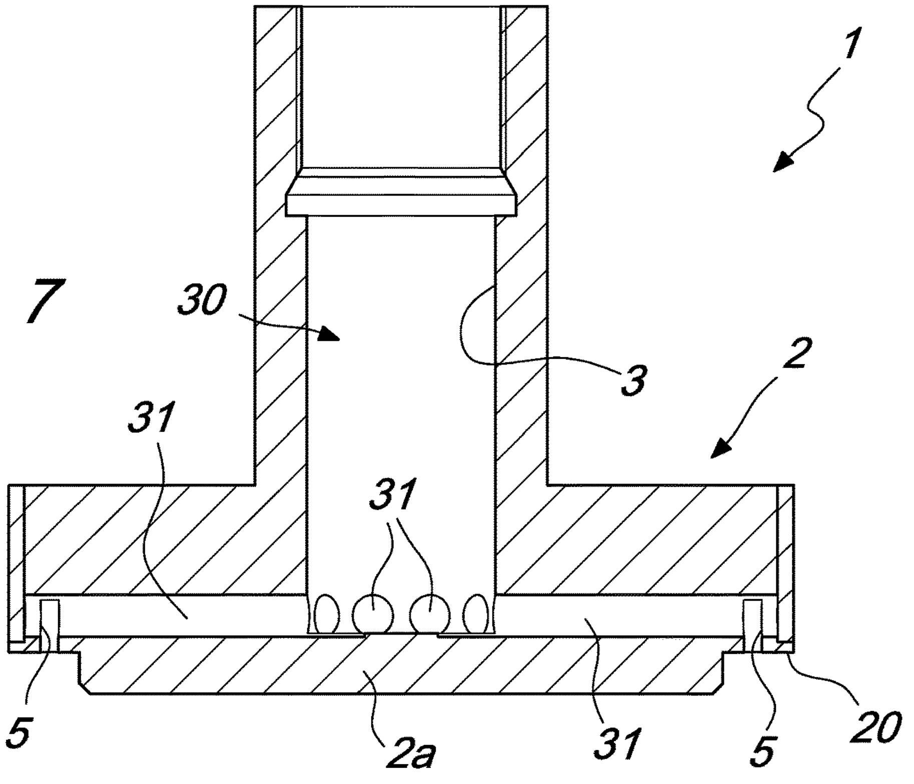
FIG. 7 is a cross-sectional view of the grip device taken along the plane of arrangement identified by the line VII-VII of FIG. 6.

With reference to the embodiment shown in FIGS. 1 to 3, the supporting element 2 comprises two plate-like elements 11, 12 which are arranged mutually facing and which define, between the respective mutually facing faces, a gap that can be passed through by the flow of air that is designed to exit from the at least one nozzle 5.

In this case, the nozzle 5 comprises the outlet of the gap directed toward the outside.

With reference to such embodiment, the plate-like element 11 arranged above has a greater radial extension than the plate-like element 12 arranged below, so as to define the surface 20 that is designed to face toward the radial flaring 52.

Alternatively, as shown in FIGS. 4 to 7, the grip device 1 comprises a supply conduit 3 constituted by a central hollow body 30, which during use is coaxial with the axis 100 of the preform 50 and is connected, by way of a plurality of radial conduits 31, to respective nozzles 5 which lead outward in order to strike the surface 20.

Such solution, which is conceptually similar, while providing less holding force, appreciably reduces the amount of air necessary for its operation.

So it is possible to use grip devices 1 with a configuration similar to that shown in FIGS. 1 to 3 at star conveyors for feeding or unloading, in which rapid displacements are needed with short holding times, and grip devices with a configuration similar to that shown in FIGS. 4 to 7 can be used when the preforms 50 are to be held for relatively long periods of time, such as for example while passing through the conditioning oven arranged upstream of a blow-molding station.

According to a further aspect, the present disclosure relates to an apparatus for handling preforms 50 of plastic for the production of containers, which comprises a supporting body that can move on command and is associated with a grip device 1 according to one or more of the preceding claims Such supporting bodies can be integrated, as explained above, in star conveyors or manipulators for feeding or unloading preforms, or they can be associated with conveyor elements, for example catenaries, for passing through a conditioning oven.

Figure 8:
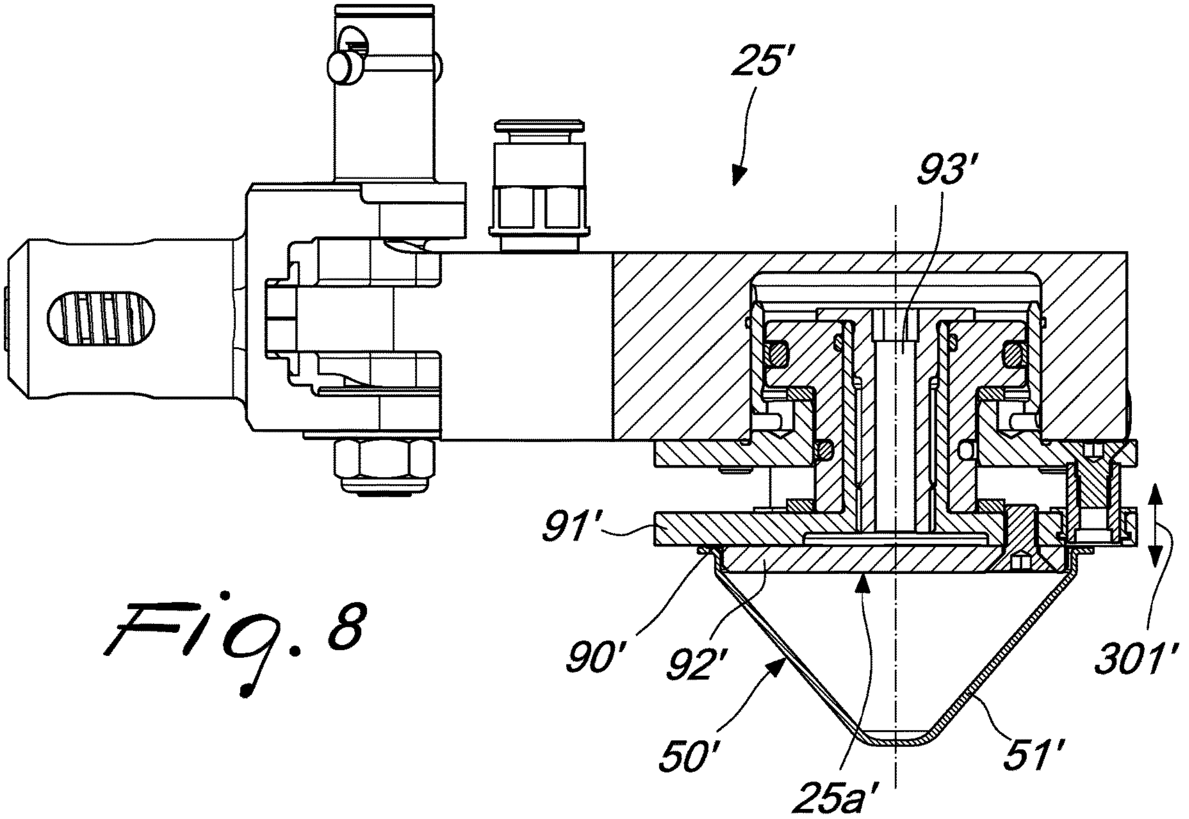
FIG. 8 is a cross-sectional view of a grip body in the condition of engagement with the preform.
Figure 9:
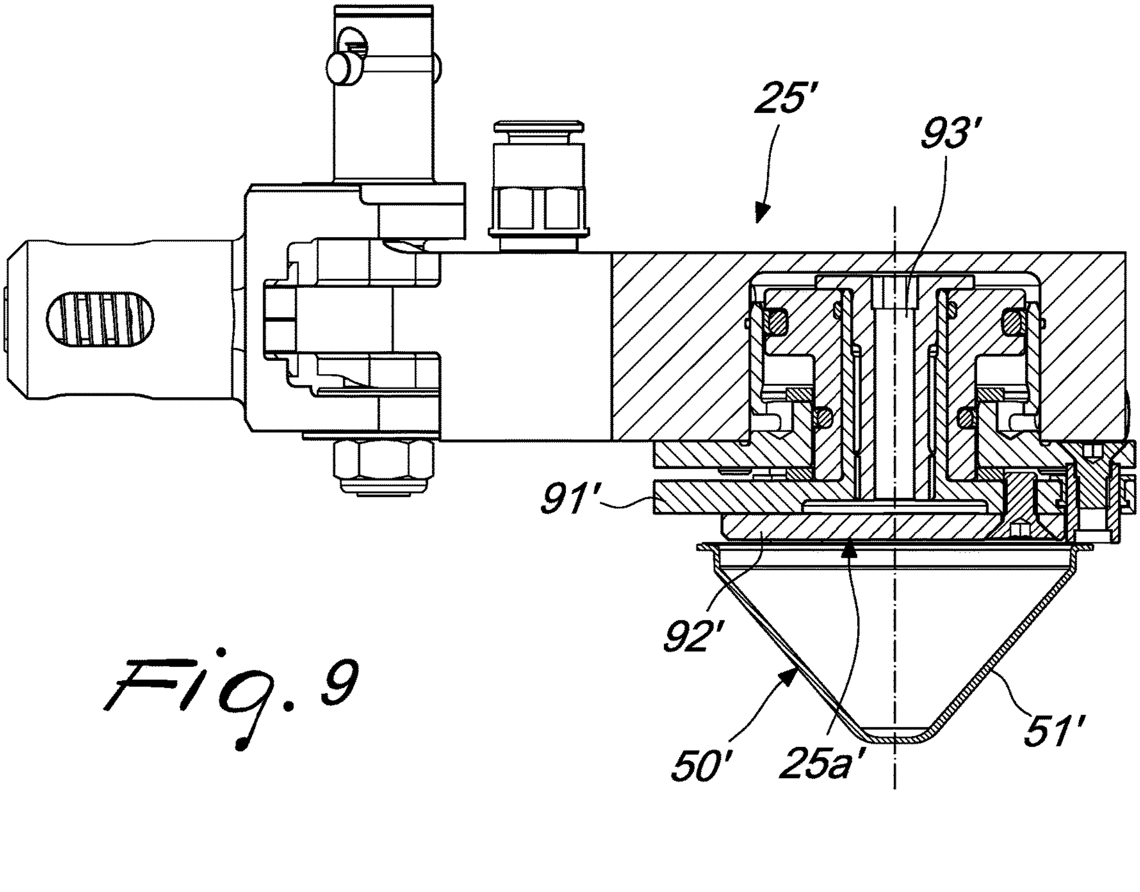
FIG. 9 is a view similar to that of FIG. 8 wherein the grip body is in the condition of disengagement from the preform.

With reference to FIGS. 8 and 9, the apparatus for handling preforms comprises a first transfer station which supports a plurality of grip elements associated with at least one respective grip device 1 which comprises a grip body 25' which is designed to pick up at least one respective preform 50', advantageously from the feeding line in order to feed it to a respective forming cavity.

The grip element comprises a first arm, which is supported so that it can rotate by a transfer carousel in order to rotate on command about a substantially vertical pivoting axis, and a second arm, which extends longitudinally and can slide on command with respect to the first arm along an advancement/retraction direction which is substantially parallel to the direction of extension of the second arm.

According to the present disclosure, the grip body 25' comprises a coupling element **25*a*' which is configured to stably hold the preform 50'** substantially by the preform mouth region.

The coupling element **25*a*'** is movable on command with respect to the second arm along a movement trajectory which has at least one component that is parallel to a vertical direction.

In particular, the coupling element **25*a*'** can move along the movement trajectory substantially at the step of disengagement from the preform mouth.

According to a possible practical embodiment, the grip body 25' is supported so that it can rotate by the second arm in order to rotate on command about a tilting axis which is substantially horizontal and substantially perpendicular to the advancement/retraction direction substantially at the step of disengagement from the preform mouth.

The angular movement of the grip body 25' about the tilting axis determines, in this case, the movement of the coupling element **25*a*'** along the movement trajectory.

With reference to the embodiment shown in FIGS. 8 and 9, it is possible for the coupling device **25*a*' to be configured to hold the preform 50' by virtue of means that are adapted to provide an air blade 90' that is directed parallel to a coupling portion 25*a*' defined by the preform 50'**.

Specifically, the means adapted to provide an air blade 90' comprise two plate-like elements 91' and 92', mutually spaced apart so as to define an annulus-shaped gap that leads, outward, into an outlet. The outlet is arranged proximate to, advantageously above, the coupling portion **25*a*', so that an air flow, supplied by a supply channel connected to the gap, can generate an air blade that will strike the coupling portion 25*a*' and as a consequence, substantially owing to the Bernoulli effect, can ensure the preform 50 is held without in practice there being any contact between the preform 50' itself and the coupling element 25*a*'**.

The operation of the grip device according to the disclosure is evident from the foregoing description.

In particular, with reference to what is shown in FIG. 1, air under pressure, for example generated by a compressor, is sent to the supply conduit 3 of a supporting device 2 according to the disclosure, under which a preform 50 is arranged which is to be held and, optionally, moved.

The air flow passing through the supply conduit (shown with the arrow 200) is sent, through the gap between the two plate-like elements 11 and 12, to the nozzle 5 (which extends about the axis 100) so as to generate an air blade that strikes the surface 20 underneath, thus creating a partial vacuum that tends to keep the preform 50 "suspended", even though there is no contact, from the supporting element 2.

When it is necessary to disengage the preform from the supporting element 2, it is possible to supply the air (as indicated by the arrow 201) to the delivery conduit 4, and therefore to the delivery port 6, so as to facilitate the disengagement of the preform 40 from the supporting element 2.

In practice it has been found that the disclosure fully achieves the intended aim and objects by providing a grip device that can be used in an extremely efficient manner with preforms of different diameters and shapes.

Furthermore, it has been found that the grip device, since it does not require direct contact with the preform, renders the management of cooling and heating extremely efficient.

The disclosure thus conceived is susceptible of numerous modifications and variations, all of which are within the scope of the appended claims Moreover, all the details may be substituted by other, technically equivalent elements.

In practice the materials employed, provided they are compatible with the specific use, and the contingent dimensions and shapes, may be any according to requirements and to the state of the art.

What is claimed is:

1. A grip device for support and movement of preforms which extends along a longitudinal axis and is of a type provided with an access port which forms, at a rim, an annular radial flaring which lies on a surface of arrangement that is substantially perpendicular to said longitudinal axis, said grip device further comprising a supporting element which is operatively associated with an air supply conduit and is connected to at least one air exit nozzle which is adapted to generate at least one respective air flow which is designed to arrange itself parallel to at least one portion of the annular radial flaring of a preform to be held in order to enable said preform to be supported without contact wherein said supporting element comprises two plate elements which are arranged mutually facing and which define, between respective mutually facing faces, a gap configured to be passed through by the air flow that is designed to exit from said at least one nozzle, said nozzle comprising an outlet of said outward-directed gap.

2. The grip device according to claim 1, wherein said supporting element comprises a centering body configured to engage at said access mouth of the preform to be supported.

3. The grip device according to claim 1, wherein said supporting element comprises a delivery port connected to an air delivery conduit which leads, during use, inward into said preform.

4. The grip device according to claim 3, further comprising actuation means configured to force a passage of air through said air delivery conduit.

5. The grip device according to claim 1, further comprising actuation means configured to force a passage of air through said air supply conduit.

6. The grip device according to claim 1, wherein said supporting element defines a surface configured to face upward toward said annular radial flaring, said at least one nozzle being adapted to convey the respective air flow to strike said surface to hold said preform.

7. The grip device according to claim 1, wherein one of the two plate elements, arranged above, has a greater radial extension than another one of the two plate elements that is arranged below, configured to define said surface.

8. The grip device according to claim 1, wherein said air supply conduit comprises a central hollow body, which in use is coaxial with the longitudinal axis of said preform and is connected by way of a plurality of radial conduits which lead into respective nozzles which lead out to strike said surface.

9. An apparatus for handling preforms of plastic for the production of containers, which comprises a supporting body configured to be moveable wherein the supporting body is associated with a grip device according to claim 1.

* * * * *